United States Patent [19]
Savagian

[11] Patent Number: 5,310,387
[45] Date of Patent: May 10, 1994

[54] DIFFERENTIAL MOTOR DRIVE
[75] Inventor: Peter J. Savagian, Clarkston, Mich.
[73] Assignee: Hughes Aircraft Company, Los Angeles, Calif.
[21] Appl. No.: 954,187
[22] Filed: Sep. 30, 1992
[51] Int. Cl.$^5$ .............................................. F16H 1/38
[52] U.S. Cl. .............................................. 475/5; 475/8
[58] Field of Search .................... 475/2, 5, 8, 149, 150, 475/900; 318/34, 49, 66

[56] References Cited
U.S. PATENT DOCUMENTS

| | | | |
|---|---|---|---|
| 1,130,053 | 3/1915 | Barnum | 475/5 |
| 1,667,718 | 5/1928 | Connell | 475/5 X |
| 3,260,133 | 7/1966 | Mattson | 475/5 |
| 4,579,019 | 9/1986 | Gabriele | 475/5 |
| 4,685,354 | 8/1987 | McCabria | 475/5 |
| 4,834,319 | 5/1989 | Ewy et al. | 475/2 X |

Primary Examiner—Dirk Wright
Attorney, Agent, or Firm—L. A. Alkov; W. K. Denson-Low

[57] ABSTRACT

A differential epicyclic power train comprising a differential epicyclic gear train coupled to two or more motors. The differential epicyclic gear train sums the inputs from the motors such that the output speed is a linear function of the input speeds of the respective motors. A brake/clutch assembly may be coupled between one or both of the motors and the differential epicyclic gear train. Various combinations of brake and clutch assemblies, and high and low power motors may be employed to achieved differing output speeds and power levels. The present invention optimizes the efficiency of the single output of the differential epicyclic gear train over the speed range of the motors. The efficiency of the power train is maximized by maximizing the amount of time each motor remains in higher efficiency regions of operation by limiting the speed range of a selected one of motors. The resulting efficiency is greater than the efficiency that is produced by a single high power variable speed motor. The present invention may be employed with motor drives of all types, but is particularly useful with motor drives for electric and hybrid automobiles, where vehicle efficiency is of prime importance, to maximize range, battery life and operating costs.

8 Claims, 4 Drawing Sheets

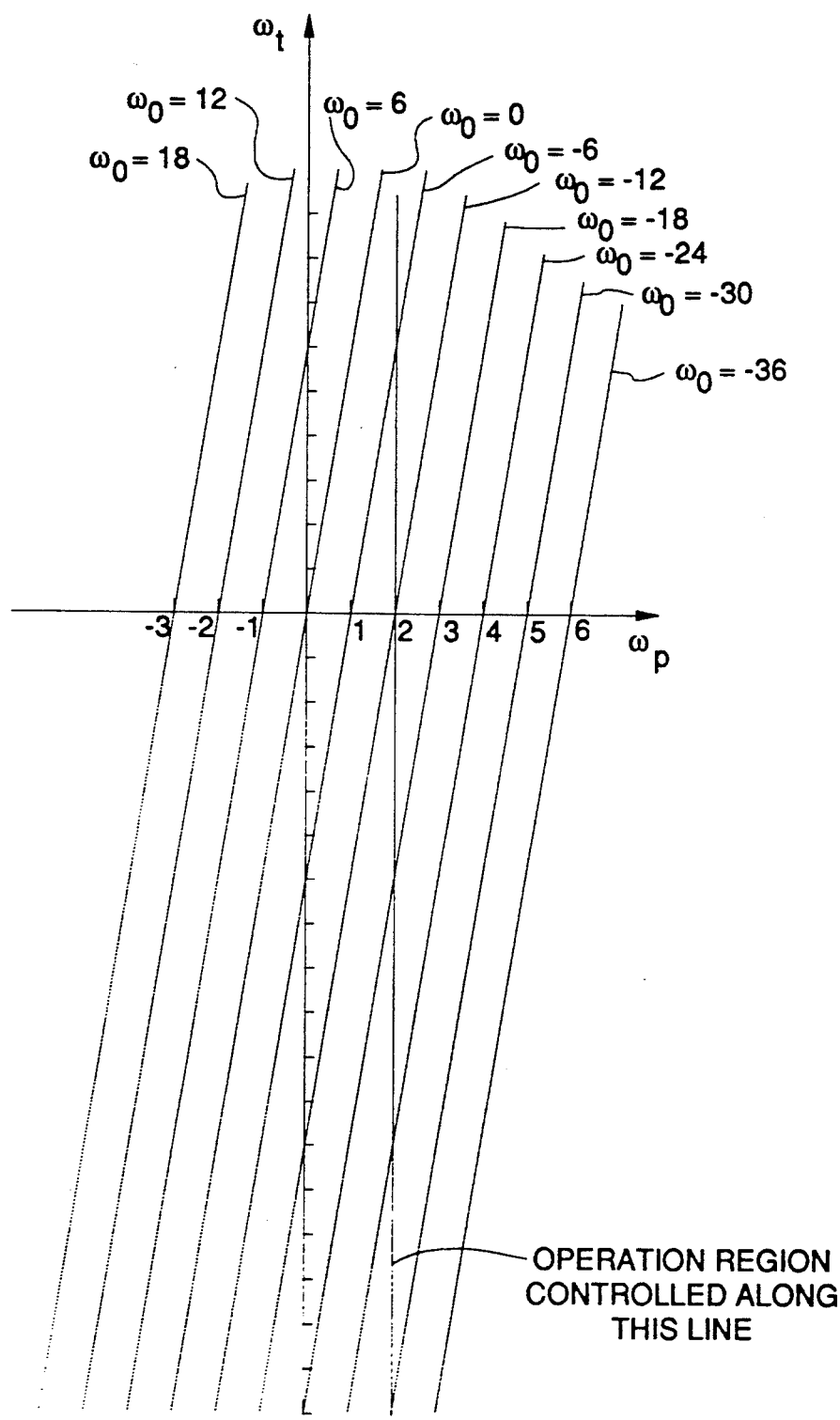

DIFFERENTIAL MOTOR DRIVE

BACKGROUND

The present invention relates generally to motors, and more particularly, to a differential epicyclic power train employing two or more motors coupled to a differential epicyclic gear train that sums the motor speeds such that the output speed of the power train is a linear function of the motor speeds.

Prior art related to the present invention includes a direct reduction gear coupled to a motor, with or without a multi-speed transmission, that provides a means for varying the output speed and maintaining the output speed of the motor within a limited speed range. Another alternative prior art approach is a variable speed high power motor, operating over a wide speed range. Both known approaches suffer from a loss of efficiency. The former direct reduction gear approach has an efficiency loss due to excessive frictional losses associated with the transmission, while the latter variable speed motor approach has an efficiency loss due to operation in low efficiency regions.

Consequently, it is an objective of the present invention to provide for a motor arrangement wherein an epicyclic gear train sums inputs from two or more motors such that the output speed of the combination is a linear function of the input speeds.

SUMMARY OF THE INVENTION

The present invention comprises a differential epicyclic power train comprising a differential epicyclic gear train coupled to two or more motors that sums the inputs from the motors such that the output speed is a linear function of the input speeds of the respective motors. A brake/clutch assembly may be coupled between one or both of the motors and the differential epicyclic gear train. A controller is provided control the respective operating speeds of the motors and optionally the action of each brake/clutch assembly. Various combinations of brake and clutch assemblies, and high and low power motors may be employed to achieved differing output speeds and power levels.

The differential epicyclic power train of the present invention controls the respective speeds of the first and second motors to produce a desired range of output speeds at the output shaft of the power train. This is achieved in accordance with the relationship $\omega_0 = R\omega_p + R'\omega_t$, where $\omega_0$ is the speed of the output shaft, $R$ and $R'$ are predetermined constants, $\omega_p$ is the speed of the first motor, and $\omega_t$ is the speed of the second motor.

The present invention thus optimizes the efficiency of the output of the differential epicyclic power train over the speed range of the motors that provide inputs thereto. The efficiency of the power train is maximized by maximizing the amount of time each motor remains in higher efficiency regions of operation by limiting the speed range of a selected one of motors. For instance, a variable speed high power output may be derived from a fixed speed high power input and a variable speed low power input. The resulting efficiency is greater than the efficiency that is produced by a single high power variable speed motor. The present invention may be employed with motor drives of all types, but is particularly useful with motor drives for electric and hybrid automobiles, where vehicle efficiency is of prime importance, to maximize range, battery life and operating costs.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 6 shows a speed graph showing the operating space for the power train of FIG. 5;

DETAILED DESCRIPTION

Figure 1:
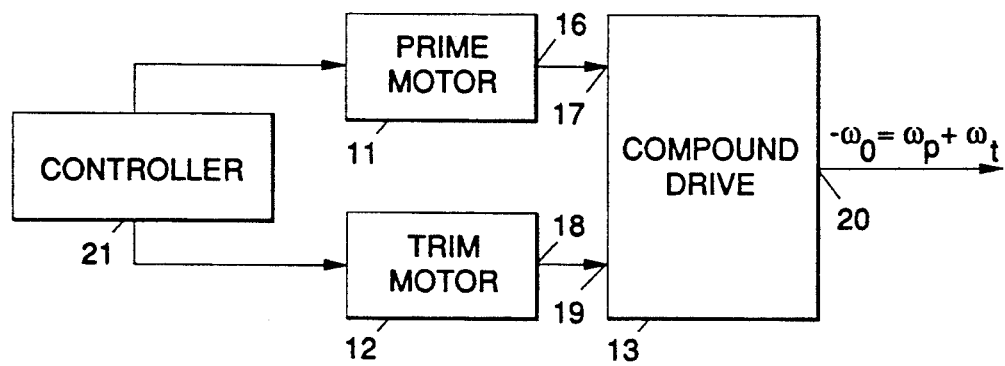
FIG. 1 illustrates a basic differential epicyclic power train in accordance with the principles of the present invention.

Referring to the drawing figures, FIG. 1 illustrates a basic differential epicyclic power train 10 in accordance with the principles of the present invention that comprises a differential epicyclic motor drive 13, comprising a differential epicyclic gear train 13, and first and second motors 11, 12 coupled thereto. In FIG. 1, and in the remainder of the description, the first and second motors 11, 12 are also identified as prime and trim motors 11, 12, respectively. An output shaft 16 of the prime motor 11 is coupled to a first input shaft 17 of the differential epicyclic motor drive 13 and provides a first input thereto. An output shaft 18 of the trim motor 12 is coupled to a second input shaft 19 of the differential epicyclic motor drive 13 and provides a second input thereto. The angular velocity or speed of an output shaft 20 of the differential epicyclic motor drive 13, and hence the differential epicyclic power train 10 is a linear function of the first and second input speeds, in accordance with the equation $\omega_0 = \omega_p + \omega_t$. A motor speed controller 21 is coupled to the prime and trim motors 11, 12, and is adapted to control the respective operating speeds thereof in order to achieve the operating characteristics of the present invention.

More specifically, the differential epicyclic motor drive 13 exhibits characteristics in accordance with the relationship $\omega_0 = R\omega_p + R'\omega_t$, where $\omega_0$ is the output speed (angular velocity) of the motor drive 13; $R$ and $R'$ are constants; $\omega_p$ is the angular velocity or speed of the prime motor 11; and $\omega_t$ is the angular velocity or speed of the trim motor 12. The output speed of the motor drive 13 is therefore a linear function of the two input speeds, $\omega_p$ and $\omega_t$. The differential epicyclic motor drive 13, which has the above properties, optimizes the efficiency of the motors 11, 12, and hence the differential epicyclic power train 10.

Figure 4:
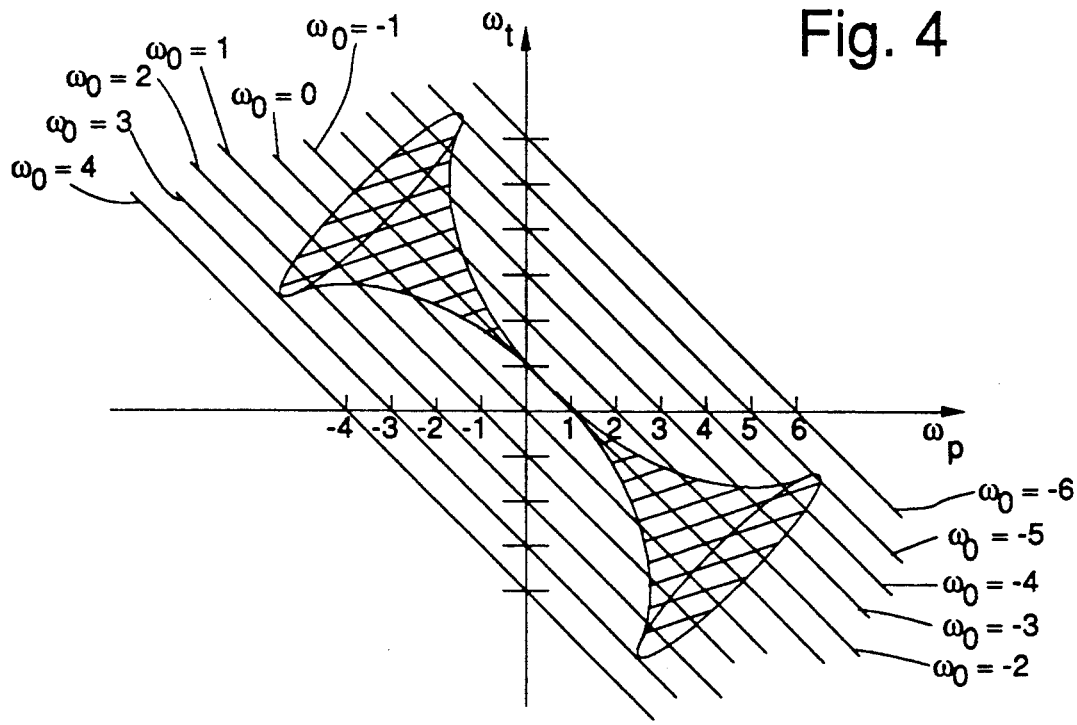
FIG. 4 shows a speed graph showing the operating space for the power train of FIG. 1.
Figure 5:
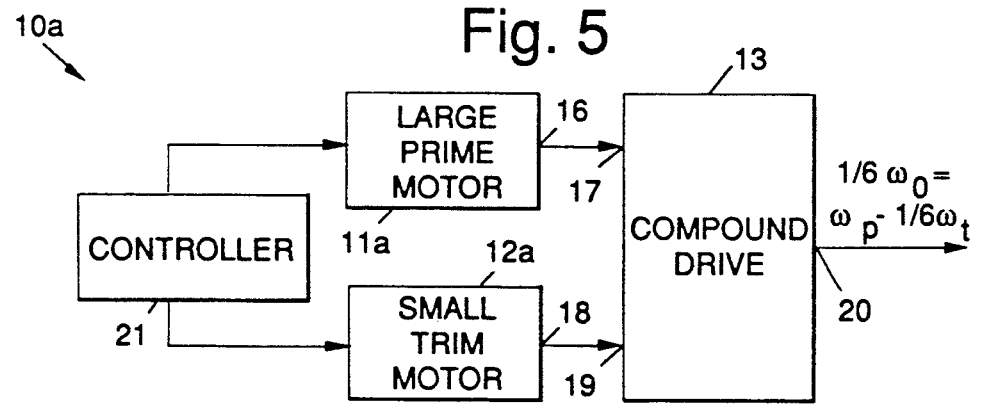
FIG. 5 illustrates an embodiment of a differential epicyclic power train including large and small motors.

The differential epicyclic motor drive 13 may be used in a variety of configurations, and modification of the basic differential epicyclic power train 10 shown in FIG. 1 includes the addition of one or more brake/clutch assemblies 14, 15 between the motors 11, 12 and the input shafts 17, 19 of the motor drive 13, or the use of different size motors 11, 12. Some of these variations are shown in FIGS. 4-6, which will be described in detail below. For the embodiments employing the clutch/brake assemblies 14, 15, the resulting drive train 10 provides for the operating modes shown in Table 1.

TABLE 1

| Mode | Brake/clutch position (p) | Brake/clutch position (t) | Output speed |
|------|---------------------------|---------------------------|--------------|
| 1    | clutched                  | clutched                  | $R\omega_p + R'\omega_t$ |
| 2    | braked                    | clutched                  | $R'\omega_t$ |
| 3    | clutched                  | braked                    | $R\omega_p$ |

The "clutched" position connects the input motor to the input shaft 17, 19; the "braked" position locks the input shaft 17, 19, and removes the associated motor speed term $R'\omega_t$, $R\omega_p$ from the output speed equation.

A better understanding of the differential epicyclic motor drive 13 may be had from a reading of a book entitled "Mechanics of Machinery Mechanisms", 1st edition, 1923, for example, published by McGraw-Hill. In particular reference is made to the differential shown at page 3-24, FIG. 326 along with the description pertaining thereto.

Figure 2:
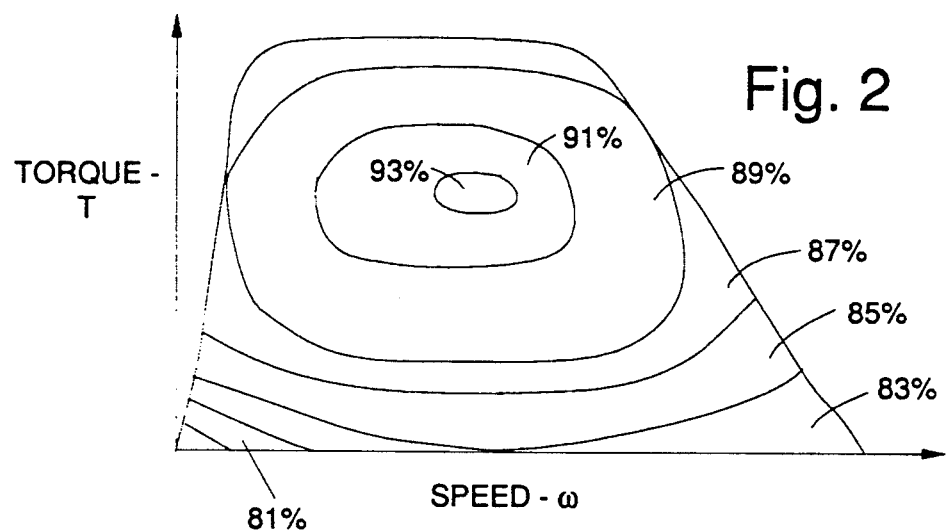
FIG. 2 shows a contour plot of efficiency versus torque and speed for a motor.

A better understanding the merits of the present invention may be had with reference to a motor efficiency map. Such a motor efficiency map is shown in FIG. 2, for a typical motor, such as the prime motor 11, for example. The motor efficiency map of FIG. 2 is a contour plot of efficiency versus torque and speed for the prime motor 11. The contours show that the efficiency ranges from 93% within the smallest contour, to 81% within the largest contour illustrated in the map.

As is depicted in FIG. 2, the efficiency of the prime motor 11 reaches a global optimum in a relatively small area of its operating space (within the 93% contour). Therefore, to achieve the best efficiency, the prime motor 11 must be maintained in a relatively narrow speed and torque range. In many applications, however, and without the use of the present invention, the preponderance of motor operation is in areas having less than optimum efficiency.

The differential epicyclic motor drive 13 and power train 10 of the present invention, for any given motor application, maximizes the amount of time the prime and trim motors 11, 12 remain in their respective higher efficiency regions, illustrated in the motor efficiency map of FIG. 2. Specifically, by using two motors 11, 12 having different efficiency maps, a higher total efficiency is achieved than is obtainable by using a single motor. The efficiency improvement is achieved by limiting the speed range of one or both of the motors 11, 12.

Figure 3:
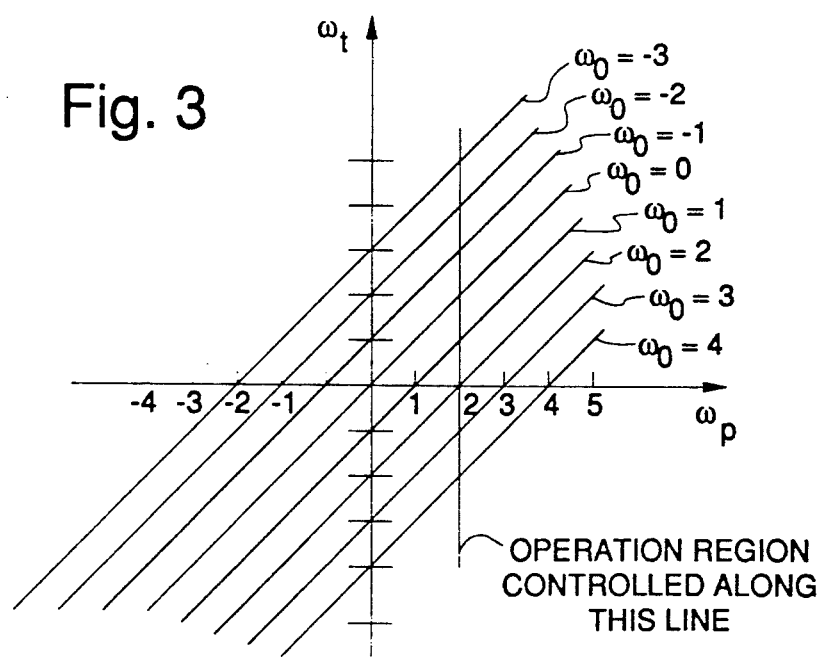
FIG. 3 shows a typical speed graph that relates output speed of the power train to the input speeds of the motors.

A useful tool for illustrating how the differential epicyclic motor drive 13 may be used is a speed graph. Such a graph is shown in FIG. 3, and it relates output speed in the space of each of the two input speeds applied to the differential epicyclic motor drive 13. As has been mentioned above, the basic operational speed relationship used in the present invention is defined by the equation $\omega_0 = \omega_p - \omega_t$. In operation, and by way of example, the operating region of the power train 10 is controlled along a vertical line shown in FIG. 3.

There are many ways in which the differential epicyclic motor drive 13 may be configured, and these are described below. Referring again to FIG. 1, if both motors 11, 12 are of equal size and have similar performance characteristics, then if the motors 11, 12 are operated in a conventional manner, both motors suffer large efficiency losses when they are operated near zero speed. This is illustrated in FIG. 4, which is a speed graph for the power train of FIG. 1. When a single motor is operated by itself, its output speed must pass through zero and go in positive and negative directions, as is shown by the diagonal lines in FIG. 4. However, in accordance with the principles of the present invention, operating both of the motors 11, 12 in predetermined speed regions under control of the motor speed controller 21 to provide a desired output speed domain for the power train 10, and in a manner that does not require either motor 11, 12 to operate near zero speed, achieves relatively high efficiency performance. This desired operating range is shown by the cross-hatched areas of FIG. 4.

FIG. 5 illustrates a differential epicyclic power train 10a including a large prime motor 11a and small trim motor 12a. FIG. 6 shows a speed graph for the embodiment of FIG. 5, illustrating the operating space for this configuration. In this embodiment, the large prime motor 11a is coupled to the first input shaft 17 of the compound epicyclic motor drive 13. The small trim motor 12 is coupled to the second input shaft 19 of the differential epicyclic motor drive 13. The motor speed controller 21 is coupled to the prime and trim motors 11a, 12a, and is adapted to control the respective operating speeds thereof. For purposes of this example, the large prime motor 11a may be a 90 horsepower size motor while the small trim motor 12a may have 1/6 the horsepower of the prime motor 11a, or 15 horsepower, for example. The large prime motor 11a also operates at synchronous speed indicated by the vertical line shown in FIG. 6. The small trim motor 12a has a reasonable efficiency rating over a wide range of operating speeds. The output speed $w_0$, has a speed range from 0 to 30 (in arbitrary units), the speeds that the vertical line intersects in the graph of FIG. 6, the large prime motor 11a is controlled by the controller 21 to synchronously rotate at a speed $w_p = +2$ (designated by the vertical line), the small trim motor 12a is controlled by the controller 21 to rotate in a speed range of $w_t = +10$ to $-18$. It is to be understood that the speeds indicated in the speed graphs are in arbitrary units and are not the actual speeds of the respective motors 11, 12. Thus, for example, if the prime motor 11a is controlled to rotate at a speed $w_p = 200$ revolutions per minute, the trim motor rotates from $w_t = +1000$ to $-1800$ revolutions per minute, and the output speed of the power train 10 is in the speed range from $w_0 + 0$ to 3000 revolutions per minute.

Figure 7:
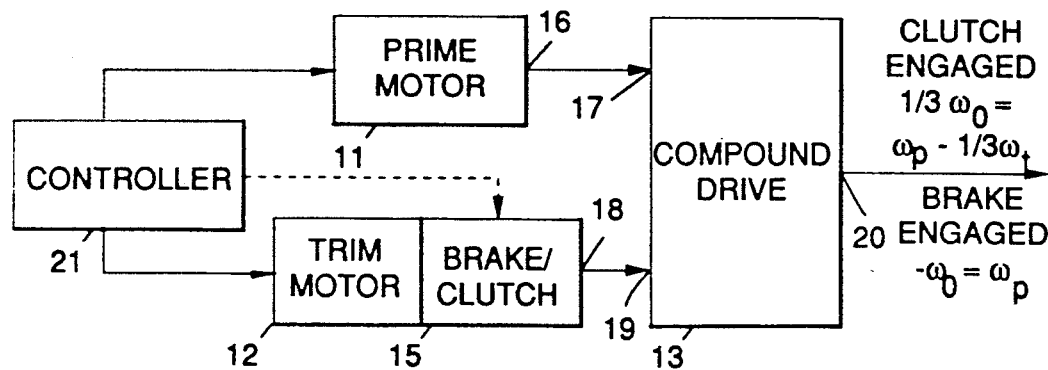
FIG. 7 illustrates an embodiment of a differential epicyclic power train including a single brake/clutch assembly.
Figure 8:
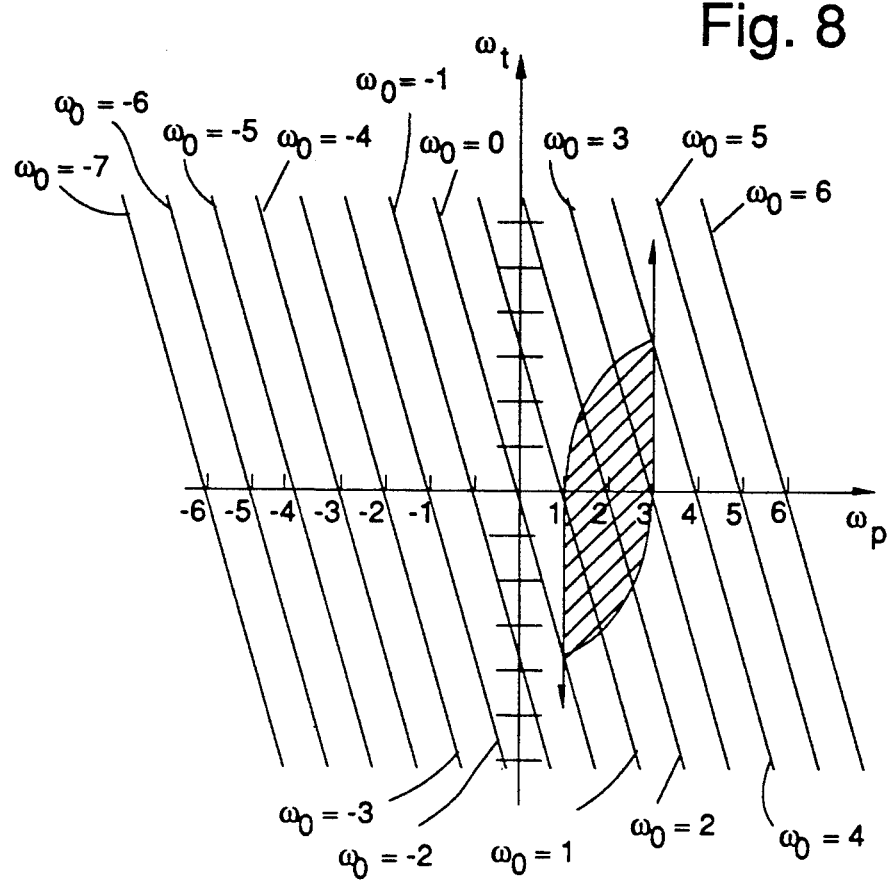
FIG. 8 illustrates an embodiment of a differential epicyclic power train including optional brake/clutch assemblies.

FIG. 7 illustrates a differential epicyclic power train 10b including a single brake/clutch assembly 15. In this embodiment, the prime motor 11 is directly coupled to the first input shaft 17 of the differential epicyclic motor drive 13. The trim motor 12 is coupled by way of a brake/clutch assembly 15 whose output shaft 18 is coupled to the second input shaft 19 of the differential epicyclic motor drive 13. The motor speed controller 21 is coupled to the prime and trim motors 11, 12, and is adapted to control the respective operating speeds thereof. Control over the respective braking and clutch action of the brake/clutch assembly 15 may optionally be provided by the controller 21, as is indicated by the dashed line coupled therebetween. For purposes of this example, the prime motor 11 may be a 90 horsepower size motor while the trim motor 12 may have ⅓ the horsepower of the prime motor 11, or 30 horsepower, for example. With the clutch of the brake/clutch assembly 15 engaged, the output of the differential epicyclic motor drive 13 is given by the equation $\frac{1}{2}\omega_0 = \omega_p - \frac{1}{2}\omega_t$. With the brake of the brake/clutch assembly 15 engaged, the output of the differential epicyclic motor drive 13 is given by the equation $\omega_0 = \omega_p - \omega_t$. The operating space is illustrated as the cross-hatched area in the speed graph shown in FIG. 8. The prime motor 11 runs quasi-synchronously (in a relatively narrow speed range) under control of the controller 21 and runs only over a narrow speed range of between 1 and 3. The trim motor 12 controlled to operate within the speed range of the prime motor 11, and occasionally outside that region, as is indicated in FIG. 8. As an alternative to the embodiment of FIG. 7, the differential epicyclic power train 10b may be used to sum power as well as speed. In this case, the trim motor 12 provides supplementary power and speed upon demand, under control of the controller 21. The trim motor 12 may also be overdriven because its duty cycle is low.

Figure 9:
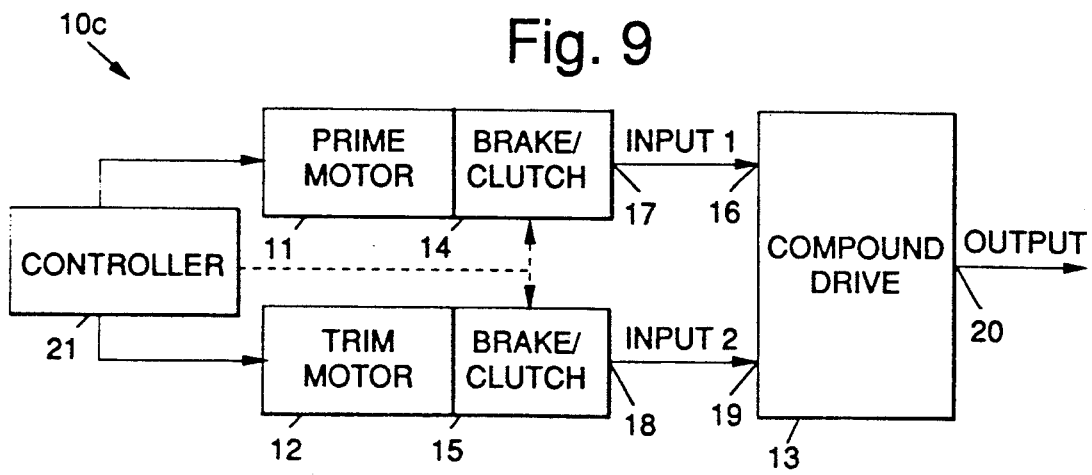
FIG. 9 shows a speed graph showing the operating space for the power train of FIG. 6.

FIG. 9 illustrates a differential epicyclic power train 10c including two optional brake/clutch assemblies 14, 15. This another example of the variability achievable by the present invention. Referring to FIG. 9, the prime motor 11 is coupled by way of a first brake/clutch assembly 14 whose output shaft 16 is coupled to the first input shaft 15 of the differential epicyclic motor drive 13. The trim motor 12 is coupled by way of a second brake/clutch assembly 15 whose output shaft 18 is coupled to the second input shaft 19 of the differential epicyclic motor drive 13. The motor speed controller 21 is coupled to the prime and trim motors 11, 12, and is adapted to control the respective operating speeds thereof. Alternatively, the trim motor 12 may have regeneration capability, either in lieu of, or in addition to the braking capability. The regeneration capability is provided by de-clutching the output of the prime motor 11 from the first input shaft 15 of the differential drive 13, and braking first input shaft 15 to the vehicle chassis or local kinematic ground. The trim motor 12 is controlled in such a way as to produce a torque opposite to the direction of its rotation, so that the trim motor 12 converts power from the mechanical form to the form that is more readily stored. This is a common feature of both electric and hydraulic motors. During regeneration, power flows from the output towards the second input shaft 19. Regeneration is generally well-understood in the art and will not be described in detail herein. Table 1 above outlines the capabilities of this embodiment. The power train 10c provides for output torque in a direction opposite to the direction of rotation of the output shaft 20. In this case the brake/clutch assembly 14 for the primary motor 11 is maintained in the "brake" position, and the brake/clutch assembly 15 for the trim motor 12 is operative in the "clutch" position. Control over the respective braking and clutch action of the brake/clutch assemblies 14, 15 may optionally be provided by the controller 21, as is indicated by the dashed lines coupled therebetween. The results of this mode of operation are such that only the trim motor 12 is coupled to the output of the motor drive 13 and the output of the power train 10c is given by $\omega_0 = \omega_p - R'\omega_t$, and wherein output shaft braking is achieved through braking/regeneration action in the trim motor 12. By varying the operating region along the vertical line shown in the speed graph of FIG. 3, for example, output speeds ranging from −1 to 4 (in arbitrary units) are achievable with a synchronous $\omega_p = 2$, and $\omega_t$ ranging from −2 to 3.

Thus, there has been described, new and improved differential epicyclic power trains employing two or more motors coupled to a differential epicyclic gear train that sums the motor speeds such that the output speed of the power train is a linear function of the motor speeds. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A differential epicyclic power train comprising:
   a first motor having a first output shaft;
   a second motor having a second output shaft;
   a differential epicyclic motor drive having a power train output shaft, and first and second input shafts that are respectively coupled to the first and second output shafts of the first and second motors, and wherein the output of the motor drive is a linear function of input speeds of the first and second motors, and
   controller means coupled to the first and second motors for controlling the respective input speeds of the first and second motors to produce a desired range of output speeds at the power train output shaft, and wherein a selected motor is controlled to operate within a predetermined relatively narrow speed and torque range to maximize the efficiency of the power train.

2. The differential epicyclic power train of claim 1 further comprising:
   a first brake and clutch assembly coupled between the first output shaft of the first motor and the first input shaft of the differential epicyclic motor drive.

3. The differential epicyclic power train of claim 2 further comprising:
   a second brake and clutch assembly coupled between the second output shaft of the second motor and the second input shaft of the differential epicyclic motor drive.

4. The differential epicyclic power train of claim 2 wherein the first brake and clutch assembly comprises a brake coupled between the first output shaft of the first motor and the first input shaft of the differential epicyclic motor drive, and wherein the second brake and clutch assembly comprises a brake coupled between the second output shaft of the second motor and the second input shaft of the differential epicyclic motor drive.

5. A differential epicyclic power train comprising:
   a first motor having a first output shaft;
   a second motor having a second output shaft;
   a differential epicyclic motor drive having a power train output shaft, and first and second input shafts that are respectively coupled to the first and second output shafts of the first and second motors, and wherein the output of the motor drive is a linear function of input speeds of the first and second motors, and controller means coupled to the first and second motors for controlling the respective input speeds of the first and second motors to produce a desired range of output speeds at the power train output shaft in accordance with the relationship $w_0 = Rw_p + R'w_t$, where $w_0$ is the speed of the output shaft, R and R' are predetermined constants, $w_p$ is the speed of the first output shaft of the first motor, and $w_t$ is the speed of the second output shaft of the second motor, and wherein the efficiency of the power train is maximized by the controller means by maximizing the amount of time each motor remains in higher efficiency regions of operation and by limiting the speed range of a selected one of the motors, such that the selected one of the motors is controlled to operate within a predetermined relatively narrow speed and torque range to maximize the efficiency of the power train.

6. The differential epicyclic power train of claim 5 further comprising:

a first brake and clutch assembly coupled between the first output shaft of the first motor and the first input shaft of the differential epicyclic motor drive.

7. The differential epicyclic power train of claim 6 further comprising:

a second brake and clutch assembly coupled between the second output shaft of the second motor and the second input shaft of the differential epicyclic motor drive.

8. The differential epicyclic power train of claim 6 wherein the first brake and clutch assembly comprises a brake coupled between the first output shaft of the first motor and the first input shaft of the differential epicyclic motor drive, and wherein the second brake and clutch assembly comprises a brake coupled between the second output shaft of the second motor and the second input shaft of the differential epicyclic motor drive.

* * * * *